US006789133B1

(12) United States Patent
Crandall et al.

(10) Patent No.: US 6,789,133 B1
(45) Date of Patent: Sep. 7, 2004

(54) SYSTEM AND METHOD FOR FACILITATING USE OF COMMODITY I/O COMPONENTS IN A LEGACY HARDWARE SYSTEM

(75) Inventors: Carl R. Crandall, Hugo, MN (US); Thomas N. DeVries, Apple Valley, MN (US); Craig B. Johnson, Shoreview, MN (US); Joseph E. Kessler, St. Anthony, MN (US); Michael C. Otto, Stillwater, MN (US); Haeng D. Park, Shoreview, MN (US); Michael J. Heideman, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 230 days.

(21) Appl. No.: 10/034,701

(22) Filed: Dec. 28, 2001

(51) Int. Cl.[7] .................................................. G06F 3/00
(52) U.S. Cl. ............................... 710/5; 710/39; 710/56; 710/65; 710/309; 709/238
(58) Field of Search .............................. 710/39, 56, 65, 710/309, 5; 709/238

(56) References Cited

U.S. PATENT DOCUMENTS

| 6,021,451 | A | * | 2/2000 | Bell et al. .................... 710/309 |
| 6,098,128 | A | * | 8/2000 | Velez-McCaskey et al. .. 710/65 |
| 6,564,271 | B2 | * | 5/2003 | Micalizzi et al. ............. 710/39 |
| 6,604,155 | B1 | * | 8/2003 | Chong, Jr. .................... 710/56 |

* cited by examiner

Primary Examiner—Jeffrey Gaffin
Assistant Examiner—Niketa Patel
(74) Attorney, Agent, or Firm—Charles A. Johnson; Mark T. Starr; Crawford Maunu, PLLC (57) ABSTRACT

A system and method for processing I/O requests in a computing system. I/O packets are created via an operating system associated with the computing system, where the I/O packets include I/O transaction information. The I/O packets are made accessible to an I/O system. A command for a channel type connecting a target I/O component to the I/O system is constructed, where this command construction is based on the I/O transaction information provided in the I/O packet, and based on physical aspects of the target I/O component and channel type provided independently of the I/O packet. The constructed command is issued to the target I/O component in accordance with the channel type.

39 Claims, 10 Drawing Sheets

SYSTEM AND METHOD FOR FACILITATING USE OF COMMODITY I/O COMPONENTS IN A LEGACY HARDWARE SYSTEM

FIELD OF THE INVENTION

This invention relates generally to input/output (I/O) processing systems, and more particularly to a system and method for facilitating use of commodity I/O components in a legacy hardware system.

BACKGROUND OF THE INVENTION

Computer systems ranging from large-scale mainframe computers to personal desktop computers generally implement various types of peripheral or "input/output" (I/O) devices. Such I/O devices may include, for example, disk drives or disk arrays, tape drives, or other storage media drives. Disk drives as used herein includes any type of disk storage media, such as magnetic floppy or hard disks, CD-ROMs, DVDs, etc. Information may generally be written to, or read from any of these various types of storage components.

As storage technology forges ahead, storage media and respective drive technology is subject to continual change. While this is often tolerable in small-scale computing systems which can be easily upgraded or replaced, the impact on large-scale computing systems is often significant. A large-scale computing system may be designed for high-end, complex applications that are generally not intended for use on small-scale machines. These large-scale computing systems often come with proprietary or otherwise non-commodity hardware and software, including the operating system. As new I/O components are developed and new channel types are devised, the legacy computing systems may be ill-equipped to handle such upgrades without design changes, particularly in the operating system.

In prior art systems, the I/O component device drivers are associated with the operating system of the central processing system, where the operating system builds commands to provide to an I/O module to drive the channel. The operating system thus accounts for any physical attributes of the device being accessed. In this type of design configuration, a new channel results in a need for an operating system change. This requires substantial development efforts to introduce new devices and channels into legacy systems.

Accordingly, it would be desirable to provide for a manner of facilitating use of new, commodity, and/or otherwise unfamiliar I/O components in a legacy system. The present invention provides a solution to these and other problems of the prior art, and offers other advantages over prior art I/O processing techniques.

SUMMARY OF THE INVENTION

The present invention relates to a system and method for processing input/output (I/O) requests in a computing system. In accordance with one embodiment of the invention, a method is provided for facilitating use of input/output (I/O) components in a computing system. The method includes creating I/O packets via an operating system (OS) associated with the computing system, where the I/O packets include I/O transaction information. The I/O packets are made accessible to an I/O system. A command for a channel type connecting a target I/O component to the I/O system is constructed, where this command construction is based on the I/O transaction information provided in the I/O packet, and based on physical aspects of the target I/O component and channel type provided independently of the I/O packet. The constructed command is issued to the target I/O component in accordance with the channel type. In this manner, the OS does not need to know I/O component characteristics or channel types, which facilitates the development and introduction of new device and channel types to the existing system operating under the existing OS.

More particular features of such a method include making the I/O packets accessible to the I/O system by creating I/O request entries in a memory that is accessible to the I/O system for each of the I/O packets that have been created. The I/O request entries may each include an address of its respective I/O packet. In another embodiment, the I/O system monitors a valid flag in each of the I/O request entries transferred, and identifies valid I/O request entries by monitoring a state of the valid flag. Another feature includes updating the I/O packet with status information after the constructed command has been processed by the target I/O component, and writing the updated I/O packet to a status queue.

In accordance with another embodiment of the invention, a method is provided for processing input/output (I/O) requests. The method includes creating I/O request packets via an operating system (OS) to perform corresponding I/O functions, such as read or write operations. I/O request packet entries corresponding to the created I/O request packets are entered onto an initiation queue. The I/O request packet entries that are successfully entered on the initiation queue are marked as valid entries. The initiation queue is polled for I/O request packet entries marked as valid entries. The I/O request packet corresponding to the I/O request packet entry is retrieved, and a device handler corresponding to at least an I/O request type and an device identifier (ID) provided in the I/O request packet is invoked. A command is constructed for a channel type for which a targeted device is connected. Constructing the command is based on at least the I/O request type and the device ID provided in the I/O request packet, and further based on physical aspects of the targeted device and the channel type provided independently of the I/O request packet. The constructed command is then issued to the targeted device to carry out the corresponding I/O function.

In accordance with another embodiment of the invention, an input/output (I/O) processing system is provided, where the I/O processing system includes a plurality of I/O components, and a plurality of device handlers each configured to drive commands to at least one of the plurality of I/O components. An initiation queue is coupled to receive I/O request identifiers from an operating system, where each of the I/O request identifiers includes an address of a corresponding I/O packet which includes I/O transaction information. An I/O manager is coupled to the initiation queue to receive the I/O request identifiers and corresponding I/O packets, and to invoke particular ones of the device handlers to drive the commands to targeted I/O components identified by the corresponding I/O transaction information. The I/O manager is configured to invoke the particular device handler based on the corresponding I/O transaction information provided in the respective I/O packet and on physical attributes of the targeted I/O components and channel types provided independently of the I/O packet.

In accordance with another embodiment of the invention, a system for facilitating use of input/output (I/O) components in a legacy computing system is provided. The system includes a legacy computing system utilizing an operating system (OS) responsible for generating I/O requests, an I/O processor, a logical interface coupling the legacy computing system and the I/O processor, and one or more I/O devices. The I/O processor includes a plurality of device handlers each configured to drive commands to at least one of the plurality of I/O components. An initiation queue is coupled to receive I/O request identifiers from an operating system, where each of the I/O request identifiers includes an address of a corresponding I/O packet which includes I/O transaction information. An I/O manager is coupled to the initiation queue to receive the I/O request identifiers and corresponding I/O packets, and to invoke particular ones of the device handlers to drive the commands to targeted I/O components identified by the corresponding I/O transaction information. The I/O manager is configured to invoke the particular device handler based on the corresponding I/O transaction information provided in the respective I/O packet and on physical attributes of the targeted I/O components and channel types provided independently of the I/O packet.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Generally, the present invention is directed to a system and method for facilitating use of I/O components in a computing system. In accordance with the invention, all hardware I/O interfaces are converted to logical interfaces. This allows for faster development and introduction of new device types and channel types (e.g., SCSI, FIBRE, etc.) to the legacy systems. The operating system using the I/O processor does not need to know or supply the physical characteristics of the device being accessed. The I/O request is based on at least the type of device (e.g., disk, tape, etc.) and a request type (e.g., read, write, etc.). In this manner, the calling element (e.g., operating system) does not need to know whether the connection to the device is through SCSI, FIBRE, SBCON, etc.

Figure 1:
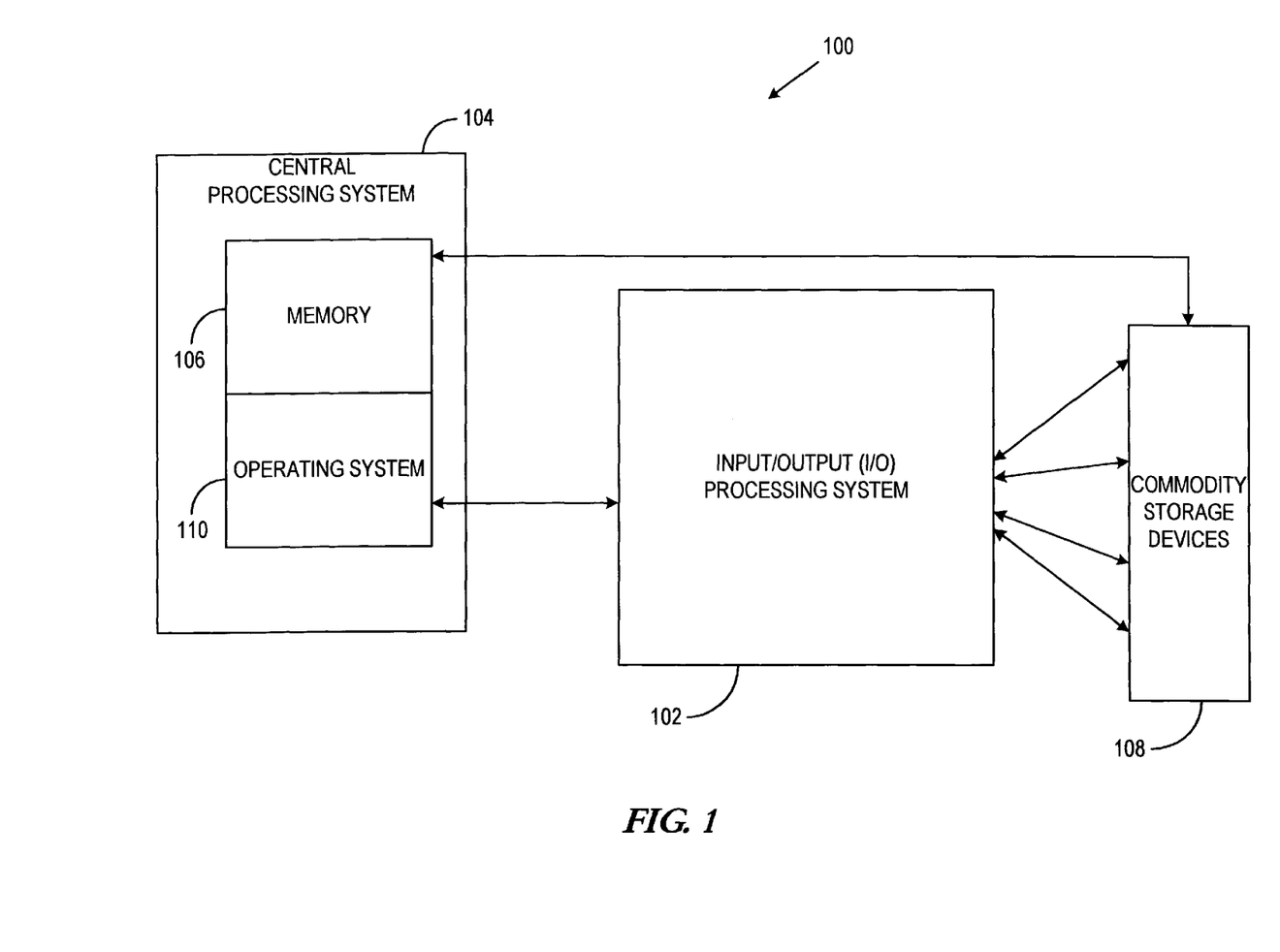
FIG. 1 is an exemplary embodiment of a computing environment incorporating an input/output (I/O) processing system in accordance with the present invention.

FIG. 1 is an exemplary embodiment of a computing environment 100 incorporating an input/output (I/O) processing system 102 in accordance with the present invention. While the present invention is applicable in any I/O environment in which storage or other peripheral devices are to be accessed, the present invention is described in connection with an emulated computing system.

In some instances, mainframe and other large computing systems have been replaced by independent computers that can communicate via a network. Where mainframe and other large computers used to provide the best means for coupling remote computers, today's networking technologies have allowed that benefit of mainframe computers to be provided via networked commodity computers. However, the data and programs used in connection with such large-scale computers are still very valuable. The resident data can run into the terabytes, and in some cases it may be too expensive to parse and reformat into another format readable by a commodity system. Therefore, it has been a worthwhile undertaking to emulate such operating systems on a modern, commodity operating system. The modern operating systems can run on a wide range of commodity hardware that is inexpensive and easily obtainable. Using emulation, the legacy data can be accessed as needed without requiring maintenance of the hardware that was originally designed to access the data.

Further, the highly reliable design of mainframe operating systems and associated application software is still very useful in many applications. Such operating systems and software can provide features such as data redundancy, data logging, security, business controls, and audits, etc. that may not be available in commodity systems. In contrast, commodity systems have been more focused on performance, usability, and in dealing with hardware advances. By using emulation, the benefits provided by a mainframe operating system can still be realized on less expensive, commodity computer systems.

In one embodiment of the invention, the central processing system 104 and associated memory 106 represents an emulated system. This computer system can emulate the operations of the original system. It is desirable, however, to be able to implement commodity storage devices 108, such as commodity tape drives and disk arrays which are readily available on the market. The I/O processing system 102 serves to interface the emulated system 104 and such commodity storage devices 108.

In prior art systems, the device drivers were associated with the operating system (OS) of the central processing system, where the OS built commands to provide to an I/O module to drive the channel. The OS thus accounted for any physical attributes of the device being accessed. In this type of design configuration, a new channel would result in a need for an OS change.

In accordance with the present invention, these tasks are moved to the I/O processing system 102, and the OS 110 is relieved of the need for knowledge of the specific physical attributes of the device being accessed. The I/O processing system 102 of the present invention accomplishes this through the use of a logical interface. The I/O request is based on the type of device (e.g., disk or tape), a command (e.g., read, write, etc.), and the amount of data requested. The caller does not need to know whether the connection to the device is through Small Computer System Interface (SCSI), FIBRE, SBCON, etc. Therefore, the I/O processing system 102 in accordance with the present invention removes the physical knowledge of I/O devices from the central processing system OS 110, and converts hardware I/O interfaces to logical interfaces. This allows for faster development, as well as introduction of new device types and channel types to the legacy system.

In accordance with one embodiment of the invention, the I/O processing system is implemented as a program (CioDLL), which runs as an application on a commodity OS such as WINDOWS (Microsoft Corp. OS trade name). In this embodiment, CioDLL serves as the Input/Output Processor (IOP) for the emulation system. The CioDLL is linked, either dynamically or statically, into the emulator to perform functions issued by the host OS 110. As stated above, the IOP implements a logical I/O interface. In other words, the host OS I/O requests include information regarding the type of request, the device being requested, the number of words to transfer, etc. The IOP includes the logic to process this request, and to build the appropriate channel type (e.g., SCSI, FIBRE, etc.) commands to be issued. The host OS does not need to know the physical aspects of the device, or channels.

Figure 2:
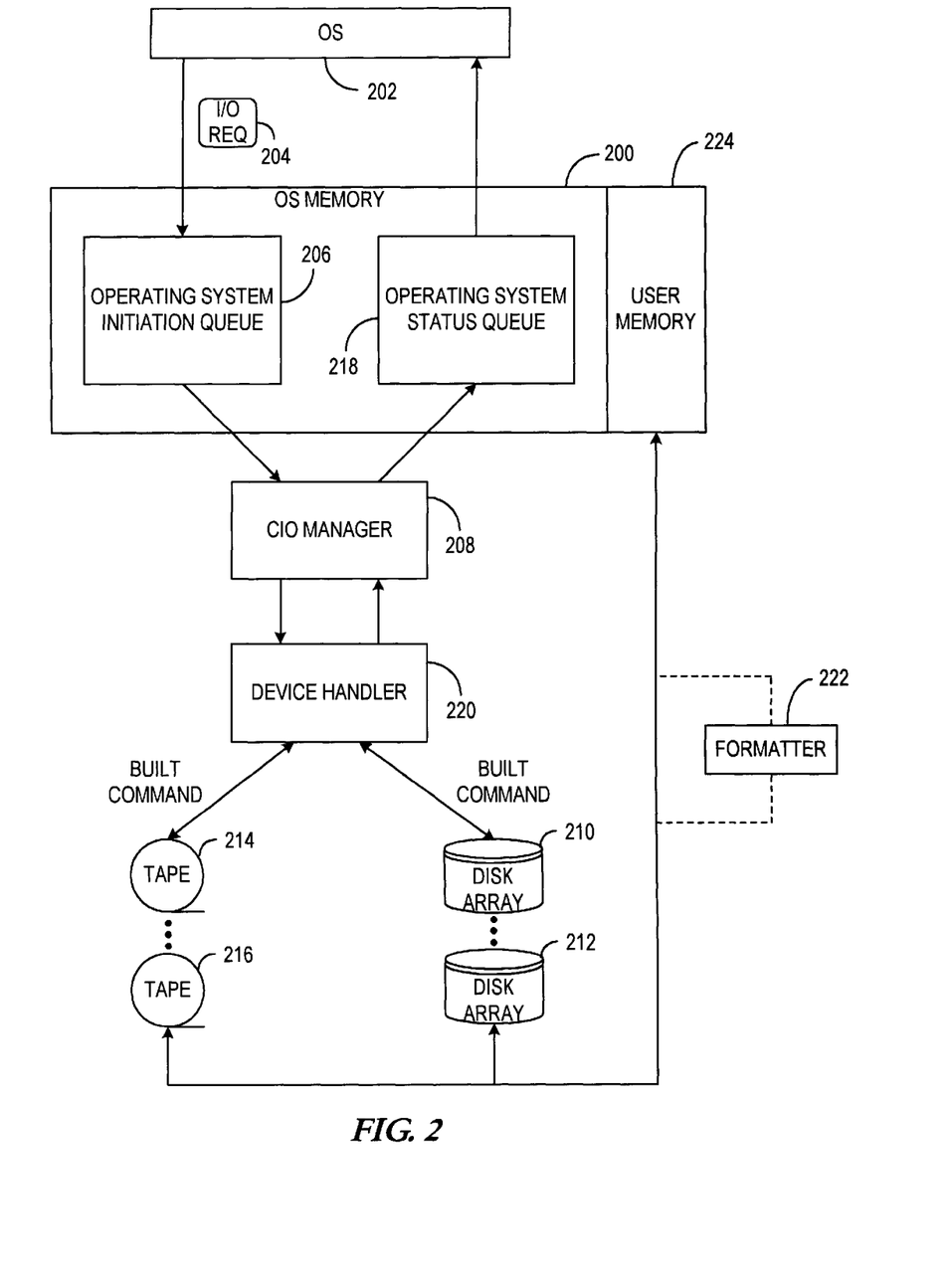
FIG. 2 illustrates one embodiment of the I/O flow control in accordance with the principles of the present invention.

FIG. 2 illustrates one embodiment of the I/O flow control in accordance with the principles of the present invention. The host system memory is visible to the IOP, as shown by the OS memory 200 and user memory 224 which may be implemented as part of the system main memory or a local memory for the OS. The host OS 202 may process a request to access an external storage device. Such a request may be a request to read a file from one of a plurality of disk arrays 210–212, or to read/write a file from/to one of a plurality of tape devices 214–216. The OS 202 takes the file name, and creates I/O requests which will allow the particular transaction to take place. The host OS 202 inputs I/O request entries 204 into the initiation queue 206 which, in one embodiment of the invention, resides in the host system memory (such as memory 106 shown in FIG. 1).

A Commodity I/O (CIO) manager thread 208 handles the processing of I/O requests that are queued to the initiation queue 206, and also returns status of the I/O request to the OS status queue 218. In one embodiment of the invention, the CIO manager 208 polls for a valid request on the initiation queue 206. In a more particular embodiment, this is accomplished via the CIO manager 208 by periodically initiating a read operation, such as a Direct Memory Access (DMA) read operation, of entries on the OS initiation queue 206. The CIO manager 208 looks for an asserted "valid flag(s)" or other indicator which indicates a valid entry on the initiation queue 206. When an I/O request is found, the thread will indicate that the I/O request is being processed by the IOP. In one embodiment of the invention, the thread indicates that the I/O request is being processed by clearing the valid flag in the corresponding initiation queue 206 entry.

Processing of any I/O request queued on the initiation queue 206 that is found to have an asserted valid flag is then initiated by the CIO manager 208. In one embodiment, this includes obtaining the address of the I/O packet, and accessing the packet information associated with that I/O packet address. For example, if the valid flag is set for a particular I/O request entry on the initiation queue 206, the CIO manager 208 obtains the address where the corresponding packet is located from the queued I/O request information. The corresponding packet can then be accessed, where the packet includes the information required to complete the I/O transaction. In one embodiment, the packet information is also retrieved using a DMA read operation, although any data retrieval operation may be employed in accordance with the invention.

The CIO manager 208 thread validates the contents of the I/O request packet and reports any errors by writing the status into the I/O request packet and putting an entry on the host system status queue 218. The host OS 202 polls the status queue 218 for I/O completions and processes the valid entries found on the status queue 218.

If the I/O request packet from the initiation queue 206 is valid, the CIO manager 208 calls the appropriate device handler 220 specified by a request type (e.g., disk, tape, etc.) and device identification (ID) supplied in the I/O request packet. The device handler 220 will build the channel command based on the information provided in the I/O request. The built command is issued to the channel at the address provided in the I/O request.

If the I/O request is a tape request, the tape device handler 220 will build the appropriate command for the channel type that the device 214–216 is connected to. For example, a read command, write command, etc. will be built by the tape device handler 220 for the particular channel type, such as SCSI, FIBRE, etc. The tape device handler 220 passes the command to the channel by calling a particular Application Programming Interface (API) using a predetermined command. As is known in the art, an API is a series of functions that programs can use to make the operating system do certain tasks. Depending on the command, data may be read from or written to the tape devices 214, 216 to/from the user memory 224. Once control is returned to the tape device handler 220, the handler will build any additional commands specified by the I/O request packet, or return status by calling the appropriate CIO manager 208 routine to post status on the status queue 218. In one embodiment of the invention, DMA transfers are executed to transfer the I/O packets to the status queue 218. When status has been posted, the tape device handler 220 returns control to the CIO manager 208.

If the I/O request is a "read from disk" request, the disk device handler 220 stages the data from disk 210–212. In an alternative embodiment, a cache memory (not shown) is also implemented, and a read from disk request first results in a determination by the disk device handler whether the requested data is already in the cache, and if so, the data is simply formatted and transferred from the cache to the system memory. Otherwise, the disk device handler 220 stages the data from disk 210–212. The device handler 220 builds the appropriate read command (e.g., SCSI, FIBRE, etc.), and issues it by calling the appropriate API. When the data is retrieved, it is optionally formatted 222 and transferred to the user memory 224. Where a cache is employed, the data will be staged to the cache, and then formatted and transferred to the user memory 224. Status is posted to the system via the status queue 218, and control is passed back to the CIO manager 208. In one embodiment of the invention, DMA transfers are executed to transfer the I/O packets to the status queue 218.

For write requests, the disk device handler 220 updates the cache with the data to be written, where a cache is implemented. Regardless, the disk device handler 220 builds the appropriate write command and calls the API to transfer the data from the memory 224 to disk 210–212. After the data is transferred to the disk, status is posted to the host system via the status queue 218, and control is passed back to the CIO manager 208. Again, DMA transfers may be used to transfer the I/O packets to the status queue 218.

When control is passed back to the CIO manager 208, the thread again polls the initiation queue 206 for I/O requests. It should be noted that multiple threads may be used to poll and process I/O requests from the host system. In one embodiment of the invention, only one thread at a time will poll for I/O requests, while multiple threads may process I/O requests.

Figure 3:
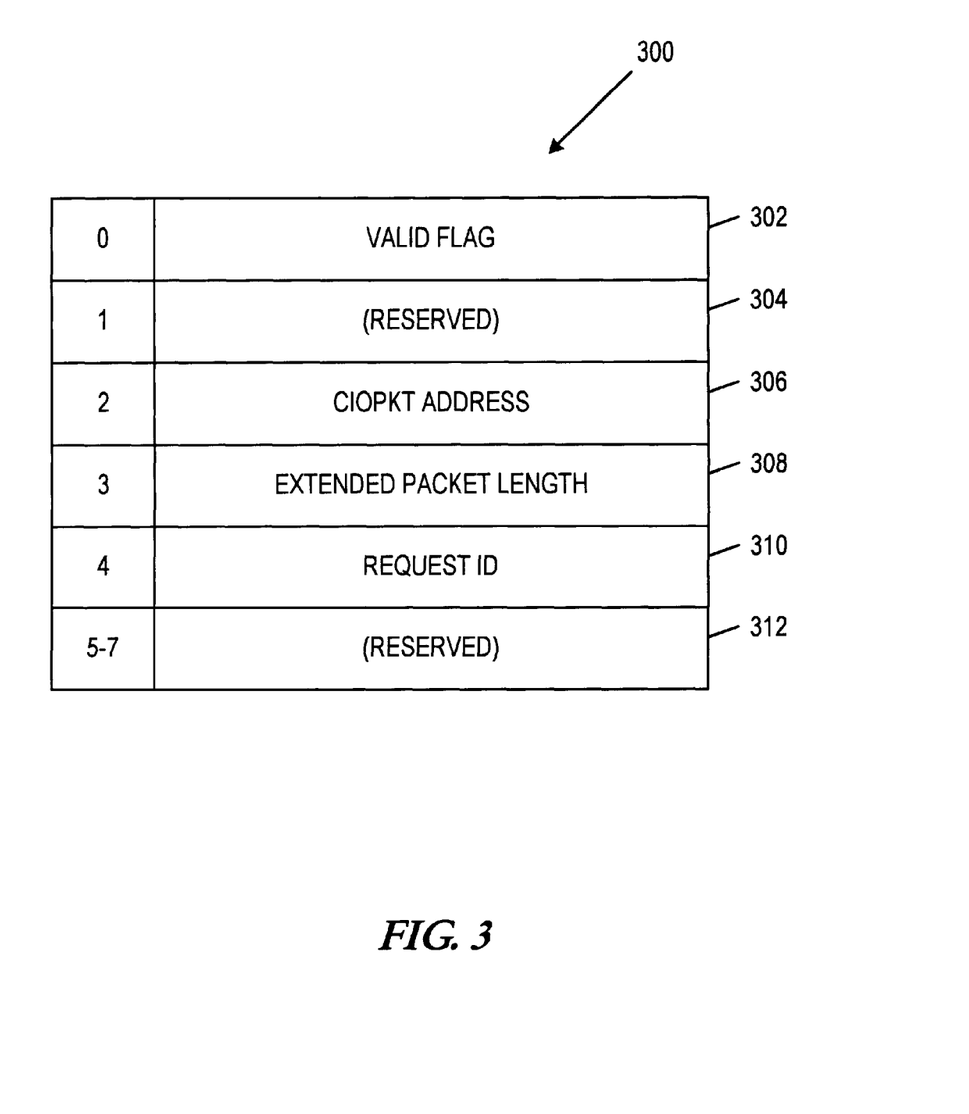
FIG. 3 illustrates an exemplary I/O request entry as it may be stored on the initiation queue.

As described above, the initiation queue 206 stores I/O request packets. Each of the entries on the initiation queue 206 is stored in a predetermined format, which can be accessed by the CIO manager 208 (see FIG. 2). FIG. 3 illustrates an exemplary I/O request entry as it may be stored on the initiation queue 206. As indicated above, the CIO manager polls the initiation queue to determine when a valid flag is set, thereby indicating that the entry is valid and a packet is ready to be initiated.

The illustrated, exemplary initiation queue entry format 300 includes a plurality of fields of a predetermined bit length, such as 32 bits, 36 bits, etc. The initiation queue entry format 300 includes some fields that are unused, such as the words corresponding to fields 304 and 312. One field relevant to the present invention is the valid flag field 302. The valid flag field indicates whether an entry is valid, contains the CIOPKT address 306 and request ID 310 of a packet ready to be initiated. The CIOPKT address 306 is the real address of a packet to be initiated, and the request ID 310 is a request identifier of the initiated packet.

Once the CIO manager takes an entry exhibiting an asserted valid flag for processing, the valid flag is returned to a non-asserted state, and the pointer to the initiation queue is advanced to the next entry. Other fields may be used to facilitate the transfer, such as the extended packet length field 308. This field 308 provides the length of the packet, plus area reserved for buffer descriptors immediately following it in physically contiguous memory. This value may be provided to permit IOP DMA optimization in transferring the packet plus any physically adjacent buffer descriptors to IOP local memory.

The CIOPKT address 306 of the packet is used to retrieve the actual packet corresponding to the CIOPKT address. The thread validates the contents of the CIOPKT and returns error status to the status queue if the packet is incorrect. If the packet is valid, the device handler is called to further process the request.

Figure 4:
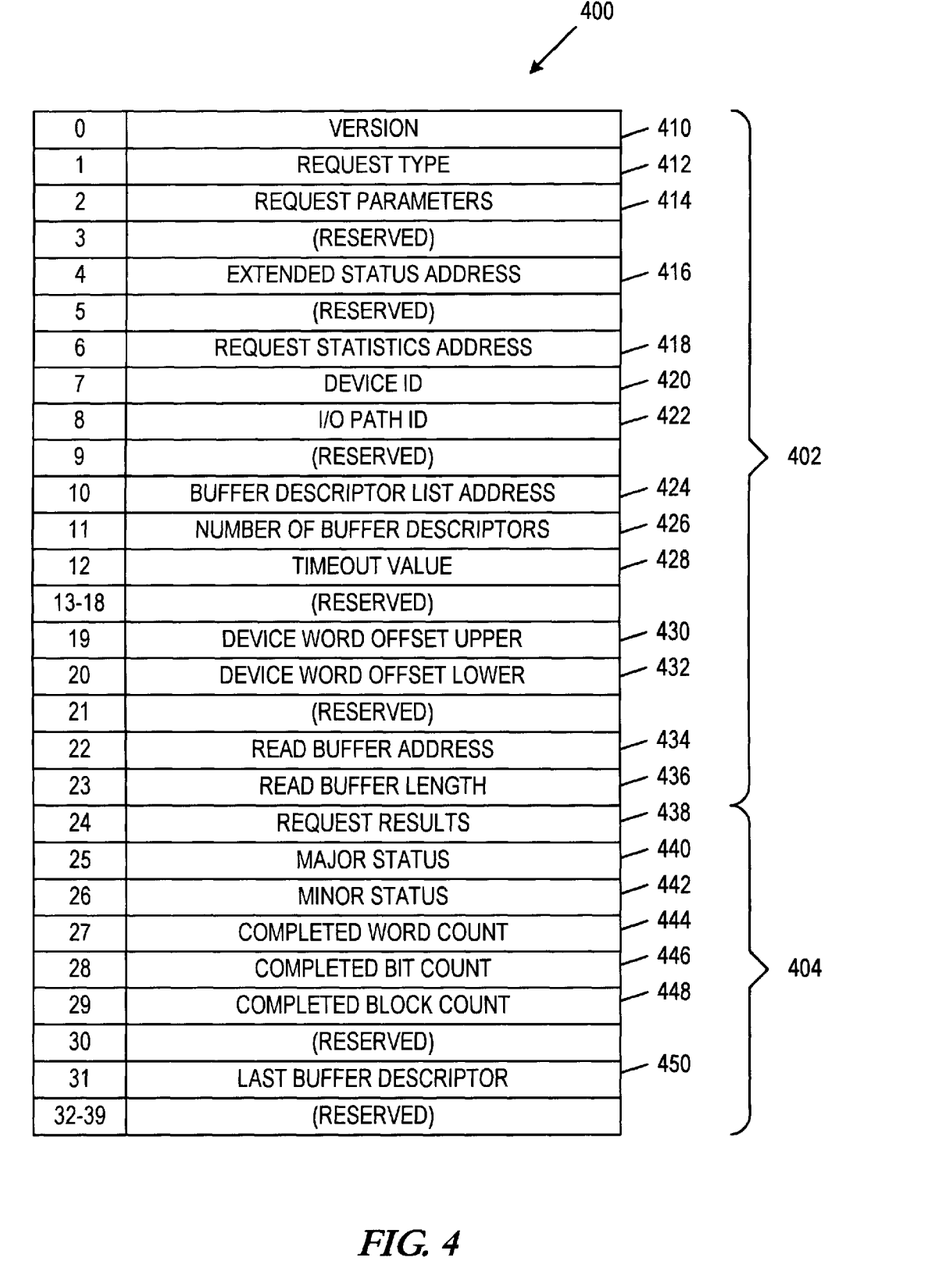
FIG. 4 illustrates an exemplary embodiment of an I/O packet request addressed by the I/O packet address.

FIG. 4 illustrates an exemplary embodiment of a CIOPKT request 400 addressed by the CIOPKT address. A variety of formats and fields may be employed in accordance with the present invention, and the CIOPKT request format provided in connection with FIG. 4 is merely representative. In this embodiment, one or more fields 402 may be written by the OS, while other fields 404 may be written by the IOP.

The version field 410 identifies the version of the CIO interface that this packet conforms to. The request type 412 identifies the type of transfer desired, such as a disk data transfer to/from the media, a disk non-data transfer, a tape data transfer to/from the media, tape non-data transfer, etc. The request parameter field 414 may be used to identify whether the packet was previously used to initiate an I/O request which either timed out or returned a failed status by the IOP, or other associated parameters. The extended status address field 416 provides the real address of an extended status, and the request statistics address field 418 identifies the real address in which to return request statistics.

The device ID field 420 is the component name table index for the target device, and is a value representing the entry for the device in a component name table. The device ID is translated to an address by the CIO manager. The I/O path ID field 422 is the interface table index for the channel module-to-control unit interface to be used to access the device. It is a value representing the entry for the interface in the interface table.

A buffer descriptor list address field 424 provides the real address of the first buffer descriptor in the buffer descriptor list, and the number of buffer descriptor field 426 indicates the number of buffer descriptors in the buffer descriptor list. The timeout value 428 is a time specification (e.g., in milliseconds) for the IOP to allow the request to complete. The device word offset upper 430 and lower 432 fields respectively provide the most significant and least significant bits of the word offset on the device at which to start the data transfer. The read buffer address field 434 provides the real address for the IOP to use for read data when performing a read-before-write for this request for a disk operation, and the read buffer length 436 field represents the read buffer length in words.

As indicated above, some fields 404 may be written by the IOP rather than the system OS. These fields include, for example, a request results field 438, which provides binary request result indicators. The major status 440 and minor status 442 fields provide predetermined status codes. The completed word count field 444 provides the number of words successfully transferred by the last command that was processed by the IOP, and is provide for commands that result in a data transfer to/from the peripheral subsystem. The completed bit count field 446 augments the completed word count 444 field, and is used if the data transfer for the last command did not end on a word boundary. In such a case, this field 446 will contain the number of bits beyond the last full word that were transferred to the subsystem for an output command or stored in memory for an input command. The completed block count field 448 is used for tape transactions, and represents the number of blocks that the tape was moved as a result of the request. The last buffer descriptor field 450 is the real address of the last command that the IOP processed or attempted to process.

The request format 400 is representative of a CIOPKT request that may be used in connection with the present invention. However, the packet format may be varied significantly in accordance with the invention. Any number of predetermined fields that provide the IOP with the requisite information to allow the CIO manager to process the I/O request and create the appropriate channel may alternatively be implemented. For example, in accordance with one embodiment of the invention, the I/O request packet includes at least the type of device (e.g., disk, tape), a command (e.g., read, write, write block, etc.), and the amount of data requested.

As described in connection with FIG. 2, the status queue 218 stores error status and/or completion status. For example, the fields 404 of I/O requests shown in FIG. 4 may store status information provided by the CIO manager, and entries corresponding to such I/O requests can then be placed on the status queue 218 for the OS 202 to obtain. In one embodiment of the invention, the OS 202 polls the status queue 218 for I/O completions, whether a successful completion or error occurs. The OS 202 processes the valid entries found on the status queue 218.

Figure 5:
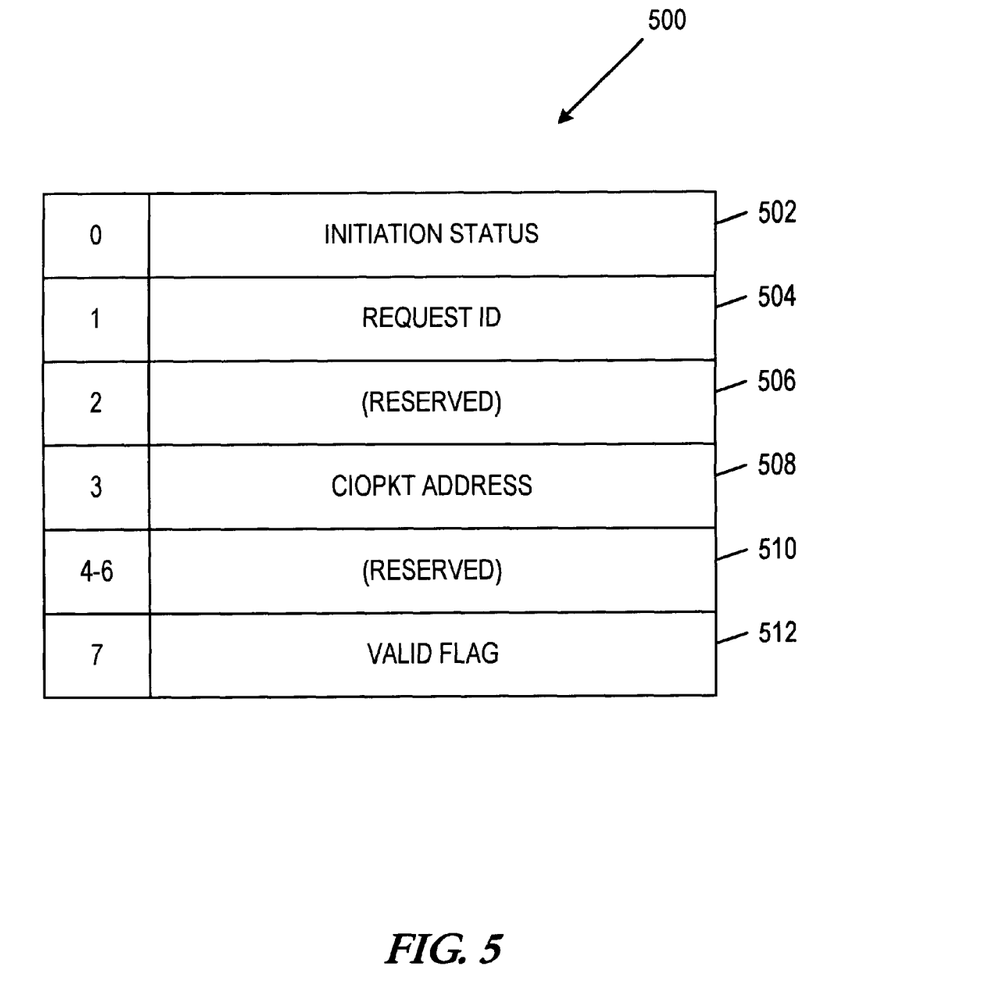
FIG. 5 illustrates an exemplary I/O request entry as it may be stored on the status queue.

Each of the entries on the status queue 218 is stored in a predetermined format, which can be accessed by the CIO manager 208. FIG. 5 illustrates an exemplary I/O request entry 500 as it may be stored on the status queue 218. In the illustrated embodiment of FIG. 5, the initiation status field 502 includes information regarding the validity and completion status of the corresponding packet. For example, the initiation status field 502 may first indicate that the packet includes request status that can be accessed, and that the request ID 504 and CIOPKT address 508 fields are valid. Other indicators in this field 502 may indicate that the CIO packet (CIOPKT) was not completed due to a storage fault occurring on a packet reference during processing. Such indicators may reveal whether the request was started or the results are indeterminate, whether or not the target device was potentially accessed, and whether or not the corresponding CIO packet can even be examined to determine any information regarding the request.

The request ID field 504 is the request ID of the associated CIOPKT. This is used to correlate the packet with the initial I/O request taken from the initiation queue 206, the CIOPKT address field 508 provides the real address of the completed CIO packet, so that the OS 202 (see FIG. 2) can obtain the particular status information provided therein. The valid flag field 512 indicates whether the entry contains valid status after posting status in a corresponding CIO packet. The OS 202 clears this flag when it has accepted responsibility for processing the completed CIO packet. Other fields may be reserved/unused, such as fields 506, 510.

Figure 6A:
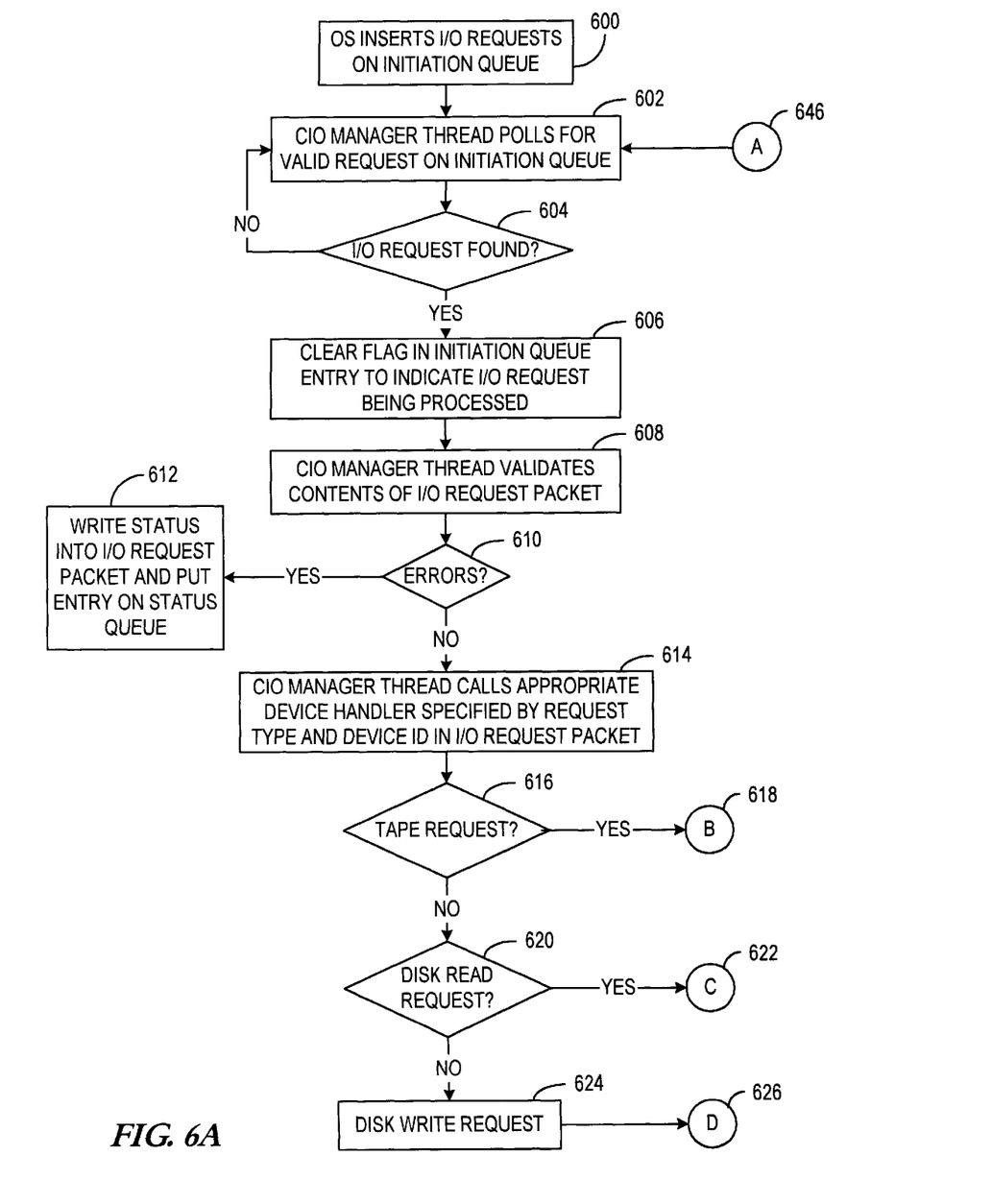
FIGS. 6A, 6B, 6C, and 6D illustrate an exemplary flow diagram of a manner of facilitating the use of commodity I/O components in a legacy system.

Referring now to FIG. 6, which includes FIGS. 6A, 6B, 6C, and 6D, an exemplary flow diagram of a manner of facilitating the use of commodity I/O components in a legacy system is provided. As shown in FIG. 6A, the OS inserts I/O requests onto the initiation queue, as shown at block 600. The CIO manager thread polls 602 for a valid request entry on the initiation queue. If no valid I/O request is found during such a polling activity as determined at decision block 604, the CIO manager may continue such polling. As described above, one manner of determining when a valid I/O request entry is on the initiation queue is to monitor the valid flag field 302 shown in FIG. 3. When a valid I/O request is found, the valid flag field of that queue entry is cleared 606 to indicate that the I/O request is being processed.

The CIO manager thread validates 608 the contents of the I/O request packet. If errors are discovered as determined at decision block 610, the appropriate status is written into the I/O request packet, and an entry is placed on the status queue as shown at block 612. If no errors are found at decision block 610, the CIO manager thread calls the appropriate device handler specified by the I/O request type (e.g., request type field 412 of FIG. 4) and device ID (e.g., device ID field 420 of FIG. 4) in the I/O request packet. The request type identifies the type of transfer desired, such as a disk data transfer to/from the media, a disk non-data transfer, a tape data transfer to/from the media, tape non-data transfer, etc. For purposes of illustration and not of limitation, the illustrated embodiment assumes either a tape read/write request or a disk read/write request.

Figure 6B:
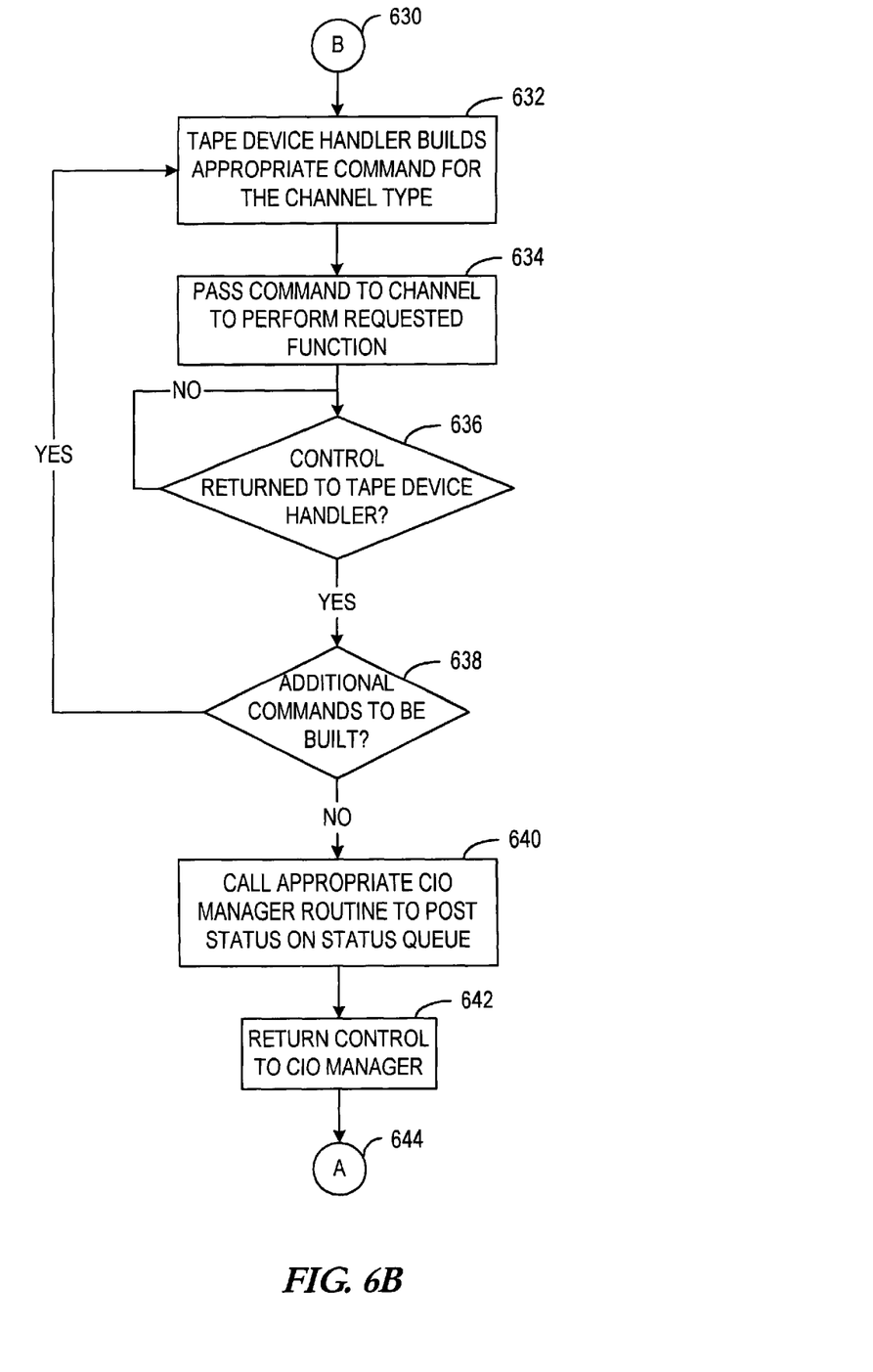

If the request type indicates a tape request as determined at decision block 616, processing continues from link "B" 618 to link "B" 630 in FIG. 6B. In this case, the tape device handler builds 632 the appropriate command for the channel type. The command which is built is passed 634 to the channel to perform the requested function (e.g., a tape read or tape write). When the command has finished processing and control has been returned to the tape device handler as determined at decision block 636, it is determined 638 whether any additional commands need to be built. If so, processing returns to block 632 where the tape device handler builds the appropriate command(s). Otherwise, the appropriate CIO manager routine is called 640 to post status on the status queue. When such status has been posted, control is returned to the CIO manager as shown at block 642, and processing returns to block 602 of FIG. 6A as illustrated via links "A" 644, 646.

Figure 6C:
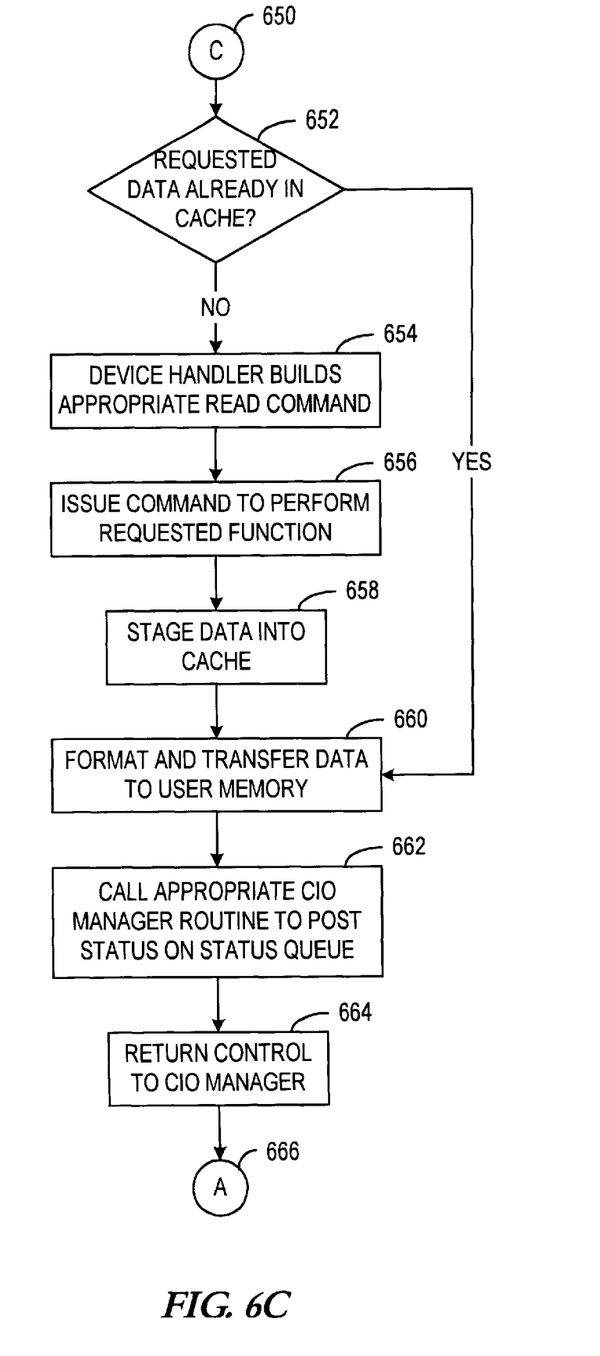

If the request type indicates a disk read request as determined at decision block 620 of FIG. 6A, processing continues from link "C" 622 to link "C" 650 in FIG. 6C. For purposes of this example, it is assumed that a cache is implemented to store certain previously read information from the disk device. For example, such a cache memory can be used to store a predetermined quantity of the most recently accessed disk information, in order to speed subsequent requests for information that is available in the cache. While the illustrated embodiment of FIG. 6C is described in connection with the use of such a cache, those skilled in the art will appreciate that the principles described herein may be applied to implementations that do not utilize such a cache memory.

Assuming the use of a cache, it is determined 652 whether the requested data is already available in the cache. If so, the data may be formatted and transferred to user memory, as illustrated at block 660. The appropriate CIO manager routine is called 662, in order to post status on the status queue. When such status has been posted, control is returned to the CIO manager as shown at block 664, and processing returns to block 602 of FIG. 6A as illustrated via links "A" 666, 646.

If the data is not available in the cache, the data must be staged from the disk. In this case, the device handler builds 654 the appropriate read command, and issues 656 the command in order to perform the requested disk read function. Again assuming the use of a cache, the data is then staged 658 into the cache. The data is then formatted and transferred to user memory as shown at block 660, the appropriate CIO manager routine is called 662 to post status on the status queue, control is returned to the CIO manager as shown at block 664, and processing returns to block 602 of FIG. 6A as illustrated via links "A" 666, 646.

As described above, the illustrated embodiment assumes either a tape read/write request or a disk read/write request. Thus, if the request type does not indicate a tape request as determined at decision block 616, nor indicates a disk read request as determined at decision block 620, the request type is a disk write request 624. In the case of a disk write request, processing continues from link "D" 626 to link "D" 670 in FIG. 6D.

Figure 6D:
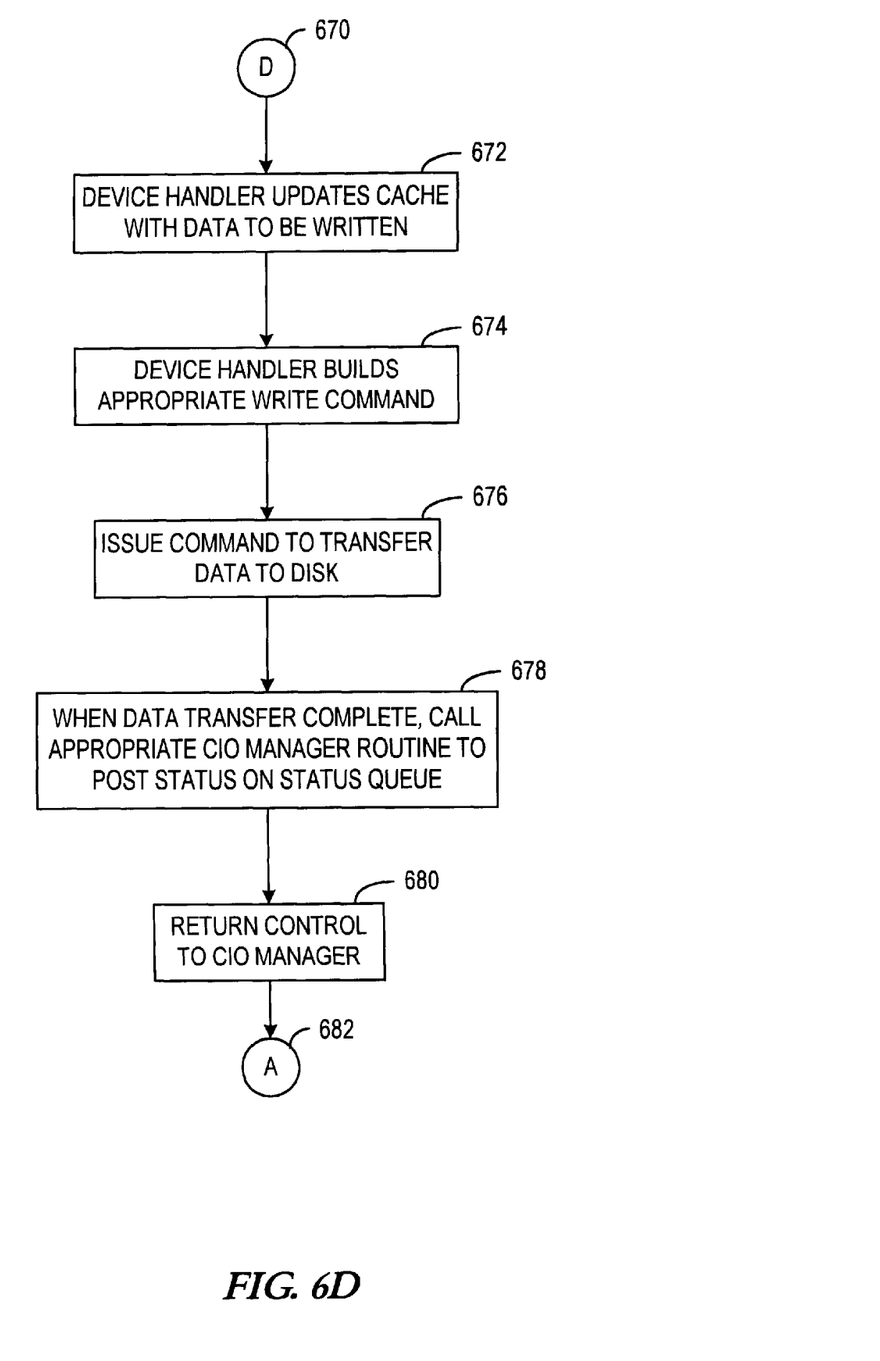

For a disk write request, the device handler updates 672 the cache with the data to be written. In one embodiment of the invention, the cache is a store-through cache. The device handler builds the appropriate disk write command from the information provided in the packet, as shown at block 674. The command is issued 676 via an API in order to transfer the data to the disk. When the data transfer is complete, the appropriate CIO manager routine is called 678 to post the status on the status queue. When such status has been posted, control is returned to the CIO manager as shown at block 680, and processing returns to block 602 of FIG. 6A as illustrated via links "A" 682, 646.

Figure 7:
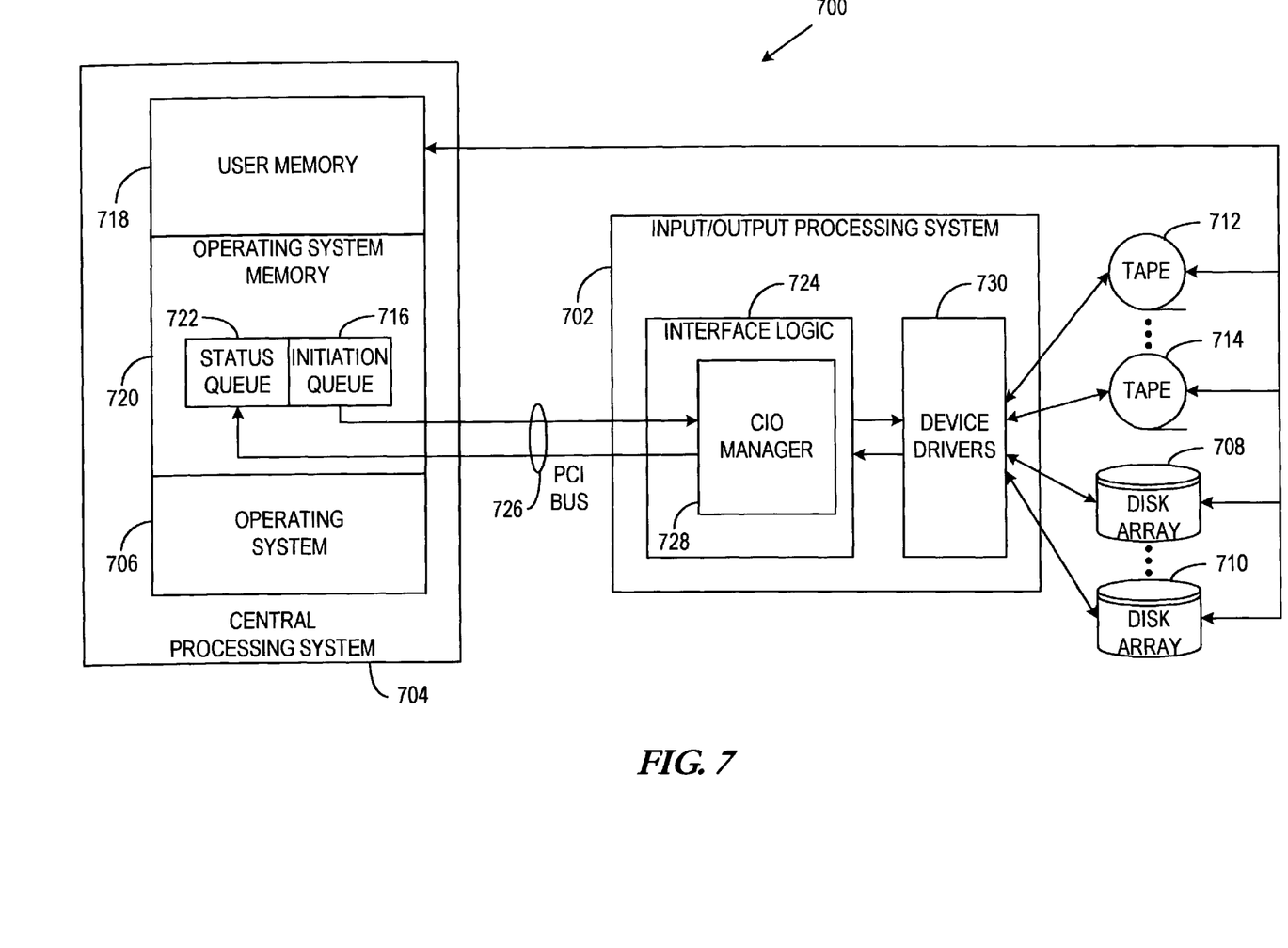
FIG. 7 is an exemplary embodiment of a computing environment incorporating an input/output (I/O) processing system in accordance with the present invention.

FIG. 7 is an exemplary embodiment of a computing environment 700 incorporating an input/output (I/O) processing system 702 in accordance with the present invention. The illustrated embodiment of FIG. 7 illustrates various modules implemented in accordance with the invention to facilitate use of the commodity I/O components using the legacy central processing system 704.

The host OS 706 may process a request to access an external storage device. Such a request may be a request to read a file from one of a plurality of disk arrays 708–710, or to read/write a file from/to one of a plurality of tape devices 712–714. The OS 706 takes the file name, and creates I/O requests which will allow the particular transaction to take place. The host OS 706 inputs I/O request entries into the initiation queue 716. The initiation queue 716 may reside in a local OS memory 720 as illustrated in FIG. 7.

In one embodiment of the invention, the initiation queue 716 and status queue 722 of the central processing system 704 communicate with the interface logic 724 of the I/O processing system (IOP) 702 via Peripheral Component Interconnect (PCI) bussing 726. A CIO manager thread 728 associated with the interface logic 724 handles the processing of I/O requests that are queued to the initiation queue 716, and also returns status of the I/O request to the OS status queue 722. As previously described, one embodiment of the invention involves the CIO manager 728 looking for an asserted valid flag or other indicator that indicates a valid entry on the initiation queue 716. When a valid I/O request is found, the thread will indicate that the I/O request is being processed by the IOP 702, and the valid flag will be cleared in the corresponding initiation queue 716 entry.

Processing of any I/O request queued on the initiation queue 716 that is found to have an asserted valid flag is then initiated by the CIO manager 728. In one embodiment, this includes obtaining the address of the I/O packet, and accessing the packet information associated with that I/O packet address. For example, if the valid flag is set for a particular I/O request entry on the initiation queue 716, the CIO manager 728 obtains the address where the corresponding packet is located from the queued I/O request information. The corresponding packet can then be accessed, where the packet includes the information required to complete the I/O transaction.

The CIO manager 728 thread validates the contents of the I/O request packet and reports any errors by writing the status into the I/O request packet and putting an entry on the host system status queue 722. The host OS 706 polls the status queue 722 for I/O completions and processes the valid entries found on the status queue 722.

If the I/O request packet from the initiation queue 716 is valid, the CIO manager 728 calls the appropriate device handler 730 specified by the request type and device identification (ID) supplied in the I/O request packet. The device handler 730 builds the channel command based on the information provided in the I/O request. The resulting command is issued to the channel at the address provided in the I/O request, in order to access the targeted commodity storage device 708, 710, 712, 714. The target data written to I/O components (e.g., devices 708, 710, 712, 714, etc.) may be provided via user memory 718, and target data read from the I/O components may be similarly directed to the user memory 718. The user memory 718 and operating system memory 720 may be an integral memory appropriately partitioned, or alternatively may be separate memory components.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for facilitating use of input/output (I/O) components in a computing system, comprising:
   creating I/O request entries via an operating system (OS) associated with the computing system, wherein the I/O request entries each respectively include a location of an associated I/O packet to provide I/O transaction information that is independent of a particular channel type and physical characteristics associated with a target I/O component;
   storing the I/O request entries in a memory accessible to an I/O system;
   retrieving the I/O packet associated with validated ones of the I/O request entries by the I/O system;
   identifying one of a plurality of device handlers of the I/O system based on the I/O transaction information;
   constructing, at the identified one of the device handlers, at least one command for the particular channel type and physical characteristics of a target I/O component based on the I/O transaction information; and
   issuing the at least one command to the target I/O component via the particular channel type.

2. The method as in claim 1, wherein the computing system is a legacy computing system operating under the control of the OS, and wherein the target I/O component is a storage device unfamiliar to the OS of the legacy computing system.

3. The method as in claim 1, wherein retrieving the I/O packet associated with validated ones of the I/O request entries by the I/O system comprises executing Direct Memory Access (DMA) transfers of the I/O request entries in the memory.

4. The method as in claim 3, further comprising monitoring, at the I/O system, a valid flag in each of the I/O request entries transferred, and identifying valid I/O request entries by monitoring a state of the valid flag.

5. The method as in claim 1, wherein the I/O transaction information comprises at least a request type and a device identifier (ID).

6. The method as in claim 5, wherein the request type comprises an identification of one of a read request or a write request.

7. The method as in claim 5, wherein the device ID comprises an identification of one of a tape drive or a disk array.

8. The method as in claim 1, further comprising:
   updating the I/O packet with status information after the constructed command has been processed by the target I/O component; and
   writing the updated I/O packet to a status queue.

9. The method as in claim 8, wherein writing the updated I/O packet to the status queue comprises executing Direct Memory Access (DMA) transfers of the I/O packets to the status queue.

10. The method as in claim 9, further comprising accessing the I/O packets by the OS.

11. The method as in claim 8, further comprising polling the status queue by the OS to obtain the status information.

12. The method as in claim 1, further comprising:
   ascertaining content validity of the I/O packets prior to constructing the command;
   updating the I/O packets having invalid content with status information;
   prohibiting the constructing and issuing of the command for the I/O packets having invalid content; and
   writing the updated I/O packet to a status queue.

13. A method for processing input/output (I/O) requests, comprising:
   creating I/O request packets via an operating system (OS) to perform corresponding I/O functions;
   entering I/O request packet entries corresponding to the created I/O request packets onto an initiation queue;
   marking the I/O request packet entries that are successfully entered on the initiation queue as valid entries;
   polling for I/O request packet entries marked as valid entries on the initiation queue;
   retrieving the I/O request packet corresponding to the I/O request packet entry;
   invoking one of a plurality of device handlers corresponding to at least an I/O request type and a device identifier (ID) provided in the I/O request packet;
   constructing a command via the invoked one of the plurality of device handlers for a channel type for which a targeted device is connected, wherein constructing the command is based on at least the I/O request type and the device ID provided in the I/O request packet, and based on physical aspects of the targeted device and the channel type provided via the invoked one of the plurality of device handlers; and
   issuing the command to the targeted device via a channel corresponding to the channel type.

14. The method as in claim 13, writing status into the I/O request packet, and storing the I/O request packet on a status queue.

15. The method as in claim 13, wherein polling for I/O request packet entries comprises retrieving the I/O request packet entries on the queue and determining whether any of the I/O request packet entries has been marked as valid.

16. The method as in claim 15, wherein retrieving the I/O request packet entries comprises performing a Direct Memory Access (DMA) read operation of the I/O request packet entries on the queue.

17. The method as in claim 13, further comprising providing an address of the I/O request packet in the I/O request packet entry, and wherein retrieving the I/O request packet corresponding to the I/O request packet entry comprises accessing the I/O request packet at the address provided in the I/O request packet entry.

18. The method as in claim 13, wherein retrieving the I/O request packet corresponding to the I/O request packet entry comprises performing a Direct Memory Access (DMA) read operation of the I/O request packet from an I/O request packet address provided in the respective I/O request packet entry.

19. The method as in claim 13, wherein marking the I/O request packet entry comprises setting a flag in a field of a packet data structure to a predetermined state indicative of a valid entry.

20. The method as in claim 13, further comprising determining the validity of contents of the I/O request packet.

21. The method as in claim 20, further comprising writing status into the I/O request packet, and storing the I/O request packet on a status queue, when the contents of the I/O request packet prove to be invalid.

22. The method as in claim 21, wherein storing the I/O request packet on a status queue comprises executing Direct Memory Access (DMA) transfers of the I/O request packets into the status queue.

23. The method as in claim 13, further comprising marking the request packet entry as no longer valid on the initiation queue when the I/O request packet has been retrieved.

24. The method as in claim 23, wherein marking the I/O request packet entry as no longer valid comprises clearing a flag in a field of a packet data structure to a predetermined state indicating that the request packet entry is no longer valid.

25. An input/output (I/O) processing system, comprising:
   a plurality of I/O components;
   a plurality of device handlers each configured to drive commands to at least one of the plurality of I/O components;
   an initiation queue coupled to receive I/O request identifiers from an operating system, wherein each of the I/O request identifiers includes an address of a corresponding I/O packet which includes I/O transaction information that is independent of a channel type and physical attributes associated with the I/O components; and
   an I/O manager coupled to the initiation queue to receive the I/O request identifiers and corresponding I/O packets, and to invoke particular ones of the device handlers to drive the commands to targeted ones of the I/O components identified by the corresponding I/O transaction information, wherein the I/O manager is configured to invoke the particular device handler based on the corresponding I/O transaction information provided in the respective I/O packet, and wherein the device handler that has been invoked constructs the commands based on the channel tvpes and physical attributes of the targeted I/O components provided independently of the I/O packet.

26. The I/O processing system as in claim 25, wherein the I/O transaction information comprises at least a request type and a device identifier (ID).

27. The I/O processing system as in claim 26, wherein the request type comprises an identification of one of a read request or a write request.

28. The I/O processing system as in claim 27, wherein the device ID comprises an identification of one of a tape drive or a disk array.

29. The I/O processing system as in claim 28, wherein the plurality of I/O components comprises at least a tape drive.

30. The I/O processing system as in claim 28, wherein the plurality of I/O components comprises at least a disk array.

31. The I/O processing system as in claim 25, wherein each of the device handlers is further configured to construct a command to issue according to the channel type to its respective targeted I/O component.

32. The I/O processing system as in claim 25, further comprising a cache to store information obtained from the targeted I/O component in response to the device handler driving the command to the targeted I/O component.

33. The I/O processing system as in claim 25, further comprising a status memory to store status information inserted into the I/O packet.

34. The I/O processing system as in claim 25, wherein the I/O manager comprises at least one I/O manager software thread to invoke the particular ones of the device handlers to drive the commands to targeted I/O components identified by the corresponding I/O transaction information.

35. A system for facilitating use of input/output (I/O) components in a legacy computing system, comprising:
   (a) a legacy computing system utilizing an operating system (OS) responsible for generating I/O requests;
   (b) an I/O processor;
   (c) a logical interface coupling the legacy computing system and the I/O processor;
   (d) one or more I/O devices;

(e) wherein the I/O processor comprises:
  (i) a plurality of device handlers each configured to drive commands to at least one of the plurality of I/O components;
  (ii) an initiation queue coupled to, receive I/O request identifiers from an operating system, wherein each of the I/O request identifiers includes an address of a corresponding I/O packet which includes I/O transaction information that is independent of a channel type and physical attributes associated with the I/O devices; and
  (iii) an I/O manager coupled to the initiation queue to receive the I/O request identifiers and corresponding I/O packets, and to invoke particular ones of the device handlers to drive the commands to targeted ones of the I/O devices identified by the corresponding I/O transaction information, wherein the I/O manager is configured to invoke the particular device handler based on the corresponding I/O transaction information provided in the respective I/O packet, and wherein the device handler that has been invoked constructs the commands based on the physical attributes of the targeted I/O devices and the channel types provided independently of the I/O packet.

36. The system as in claim 35, wherein the computing system is a legacy computing system operating under the control of the OS, and wherein the target I/O component is a storage device unfamiliar to the OS of the legacy computing system.

37. The system as in claim 36, wherein the storage device is a tape drive.

38. The system as in claim 36, wherein the storage device is a disk array.

39. An input/output (I/O) processing system for facilitating use of I/O components in a computing system, comprising:
  means for providing I/O request entries via an operating system (OS) associated with the computing system, wherein the I/O request entries each respectively include a location of an associated I/O packet to provide I/O transaction information that is independent of a particular channel type and physical characteristics associated with a target I/O component;
  means for storing the I/O request entries in a memory accessible to an I/O system;
  means for retrieving the I/O packet associated with validated ones of the I/O request entries by the I/O system;
  means for identifying one of a plurality of device handlers associated with the I/O system based on the I/O transaction information; and
  wherein each of the device handlers comprises means for constructing at least one command for the particular channel type and physical characteristics of a target I/O component based on the I/O transaction information, and comprising means for issuing the at least one command to the target I/O component via the particular channel type.

* * * * *